US009744535B2

(12) United States Patent
Belz et al.

(10) Patent No.: US 9,744,535 B2
(45) Date of Patent: Aug. 29, 2017

(54) CASSETTE WITH MULTIWELL PLATES

(75) Inventors: Renato Belz, Rothenburg (CH); Christian Thalmann, Kehrsiten (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 1239 days.

(21) Appl. No.: 13/086,856

(22) Filed: Apr. 14, 2011

(65) Prior Publication Data

US 2012/0094388 A1 Apr. 19, 2012

(30) Foreign Application Priority Data

Apr. 19, 2010 (EP) .................................... 10160358

(51) Int. Cl.
*G01N 35/02* (2006.01)
*B01L 9/00* (2006.01)
*B01L 3/00* (2006.01)

(52) U.S. Cl.
CPC ........... *B01L 9/523* (2013.01); *B01L 3/50255* (2013.01); *B01L 2200/025* (2013.01); *B01L 2300/021* (2013.01); *B01L 2300/044* (2013.01); *B01L 2300/0829* (2013.01); *Y10T 436/113332* (2015.01)

(58) Field of Classification Search
CPC ................ B01L 3/50255; B01L 9/523; B01L 2200/025; B01L 2300/044; B01L 2300/0829; B01L 2300/021; Y10T 436/113332
USPC ...................................... 422/63, 554; 436/47
See application file for complete search history.

(56) References Cited

U.S. PATENT DOCUMENTS

| | | | | |
|---|---|---|---|---|
| 6,699,437 | B1 | 3/2004 | Astle | |
| 8,530,229 | B2 * | 9/2013 | Ochsenbein et al. | 435/287.1 |
| 2003/0168458 | A1 | 9/2003 | Lafferty et al. | |
| 2006/0188411 | A1 | 8/2006 | Zimmermann et al. | |
| 2007/0184546 | A1 * | 8/2007 | Farrelly et al. | 435/286.3 |
| 2008/0193338 | A1 | 8/2008 | Nichols et al. | |
| 2008/0260511 | A1 | 10/2008 | Fattinger et al. | |
| 2011/0306053 | A1 * | 12/2011 | Ochsenbein | G01N 35/0098 435/6.12 |
| 2012/0058900 | A1 * | 3/2012 | Gisler | G01N 35/0099 506/7 |

FOREIGN PATENT DOCUMENTS

| | | | |
|---|---|---|---|
| EP | 2022736 | A1 | 2/2009 |
| JP | 2006177817 | | 7/2006 |
| WO | 2005016545 | A1 | 2/2005 |

OTHER PUBLICATIONS

Hawkins, Trevor L., et al., 1997, "A Magnetic Attraction to High-Throughput Genomics", Science, 276:1887-1889.

* cited by examiner

*Primary Examiner* — Rebecca M Fritchman
(74) *Attorney, Agent, or Firm* — Pamela C. Ancona; M. Reza Savari

(57) ABSTRACT

A cassette is described which can hold at least two multiwell plates. The cassette comprising the multiwell plates can be loaded into a stacker of an automated analytical apparatus. While the stacker holds down the cassette, a lift pushes the multiwell plates upwards to make them accessible to a handler which can engage and transport the multiwell plates to a plate holder in the working area of the analytical apparatus.

10 Claims, 16 Drawing Sheets b)

CASSETTE WITH MULTIWELL PLATES

CROSS-REFERENCES TO RELATED APPLICATIONS

The present application claims the benefit of priority under 35 U.S.C. §119 of EP10160358.7, filed Apr. 19, 2010, the contents of which is incorporated by reference herein in its entirety.

FIELD OF THE INVENTION

The present invention relates to the field a packaging of multiwell plates for use in automated diagnostic analyzers, and to analytical analyzers and analytical methods comprising multiwell plates with such packaging.

BACKGROUND OF THE INVENTION

To perform analytical testing in automated analyzers, consumables such as reaction tubes and/or multiwell plates have to be loaded into the analytical apparatus. Multiwell plates are loaded into stackers and then transferred from the stacker to the site where they are required for the analytical process.

The present invention provides a new packaging for multiwell plates with improved characteristics.

SUMMARY OF THE INVENTION

The present invention relates to a cassette for holding at least two multiwell plates. The cassette comprises two short side walls located opposite each other, two long side walls located opposite each other, an open top, wherein said open top is sized to allow a multiwell plate to pass, a bottom surface with an opening, wherein said opening comprises an area which is smaller than the area of a multiwell plate.

The present invention also relates to an analytical system comprising an apparatus for analyzing a sample comprising an analyte; a stacker, wherein said stacker comprises at least one cassette described herein, wherein said stacker comprises at least one lobe, wherein said lobe interacts with said slit comprised in said base located on the top of said side walls. The analytical system further comprises a handler for transferring multiwell plates from said stacker to said apparatus for analyzing said analyte.

In one aspect, the present invention also relates to a method of analyzing an analyte, comprising the steps of: a) loading a cassette as described herein into a stacker of an analytical system; b) transferring a multiwell plate set from said cassette to a position for preparing a reaction mixture with a handler; c) preparing said reaction mixture; d) transferring said multiwell plate comprising said reaction mixture to a temperature controlled incubator; e) analyzing said analyte; wherein steps b) to e) are automated.

DETAILED DESCRIPTION OF THE INVENTION

Figure 1:
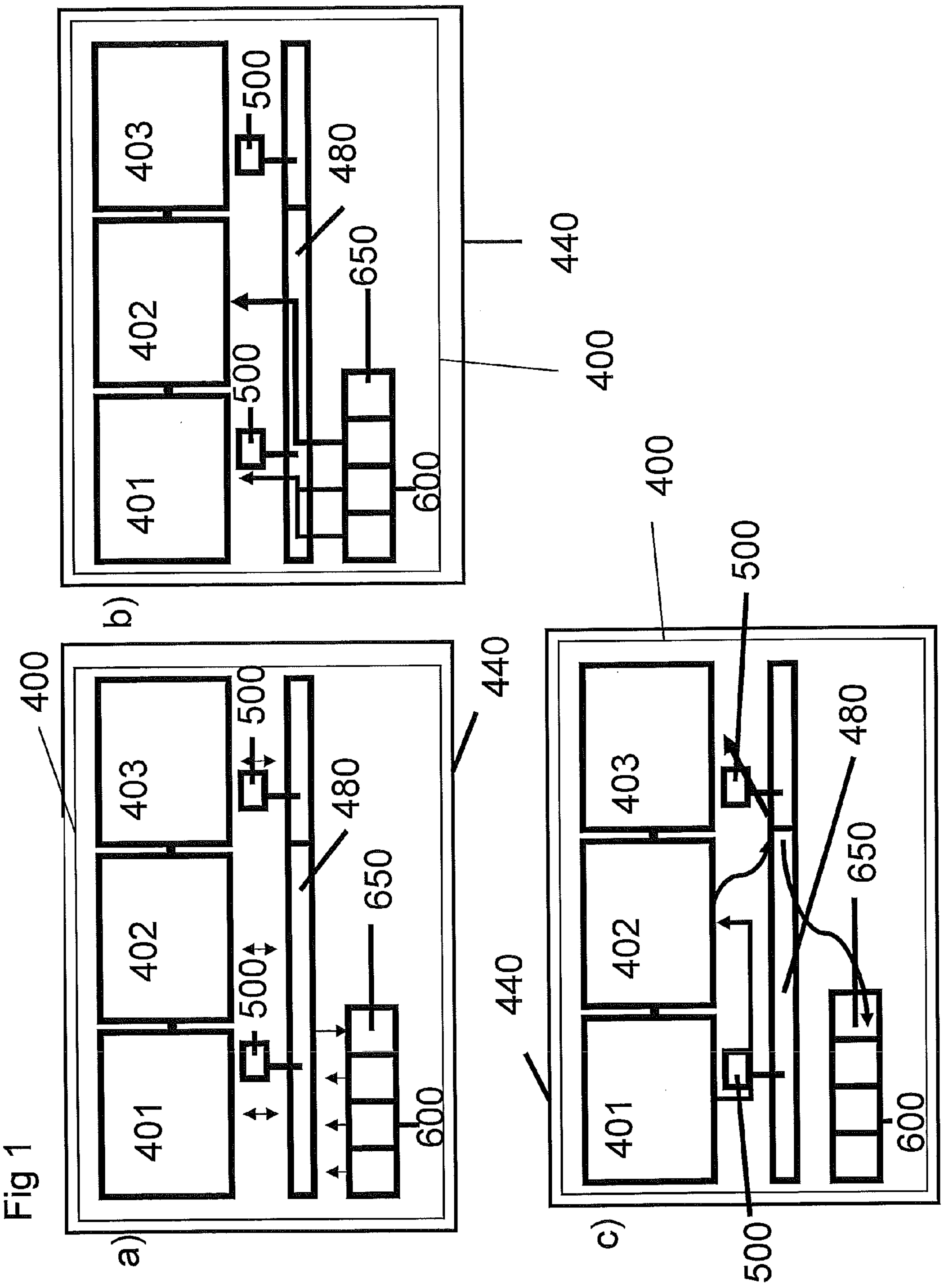
FIG. 1 shows schematic drawings of an analyzer comprising different stations, modules or cells.

The present invention relates to a cassette for holding at least two multiwell plates. The cassette comprises two short side walls located opposite each other, two long side walls located opposite each other, an open top, wherein said open top is sized to allow a multiwell plate to pass, a bottom surface with an opening, wherein said opening comprises an area which is smaller than the area of a multiwell plate.

In one aspect of the present invention, the cassette comprises at least two multiwell plates stacked on each other, wherein said multiwell plates comprise more than one vessel. In a preferred embodiment, the cassette comprises at least two multiwell plates with a lid, said multiwell plates being stacked on each other. More preferably, the cassette comprises at least two multiwell plate sets, wherein any one of said multiwell plate sets comprises a multiwell plate and a lid, wherein said lid comprises a frame and a sealing foil affixed to said frame, wherein said lid is located on said multiwell plate in a first position, said first position comprising a separation distance located between said sealing foil and the top surface of said multiwell plate. Preferred embodiments of multiwell plates and lids are described hereinafter.

The cassette according to the invention has several advantages, especially for multiwell plates which are used for amplification and/or detection of nucleic acid analytes. Common problems encountered with such multiwell plates is that they may be contaminated, eventually leading to false test results. In the case of plates with a lid, the lid may become separated from the plate before they are loaded into the stacker of the analytical apparatus. Or the seal may become scratched. The cassette of the present invention makes handling of the multiwell plates with a lid significantly easier than direct handling of the multiwell plates with a lid. The user can load several multiwell plates at once into the stacker. It is less likely that the multiwell plates and lid will be separated. Furthermore, the risk of scratching the surface of the multiwell plates is reduced. Scratching may cause irregular sealing. Reduced risk of scratching would, thus, also provide for more reliable sealing and more reliable processing of the samples comprising the analyte.

Thus, the cassette allows for easier, safer and faster loading of multiwell plates into the analytical apparatus.

In one aspect of the cassette of the invention, the cassette comprises at least one guidance on the inside of any one of said side walls for guiding said multiwell plates into a centered position. Preferably, any one of said side walls comprises at least two guidances on the inside wall. This ensures loading of the cassette in the correct position, and proper subsequent automated handling of the plates with the lid.

In one aspect of the present invention, the top of said side walls comprise notches for allowing a handler to handle the multiwell plate located on the top of the stack of multiwell plates. Preferably, the notches are located on a base on the top end of the two long side walls. Said notches allow a form-fitting handling of the multiwell plates as described hereinafter.

In one aspect of the present invention, the top end of the cassette comprises a base extending around the top of the side walls, said base comprising stabilizing slits. Said stabilizing slits can interact with stabilizing lobes on the stacker. The interaction of stabilizing slits and stabilizing lobes ensures a correct positioning of the cassette in only the stacker or stackers intended for holding said cassette.

In one aspect of the cassette of the invention described hereinbefore, said multiwell plate comprises a bolt (821), wherein the bottom end of said bolt extends below the bottom end of the vessels of the multiwell plate.

In one aspect, the present invention relates to an analytical system comprising an apparatus for analyzing a sample comprising an analyte. The analytical system further comprises a stacker, wherein said stacker comprises at least one cassette as described hereinbefore. The stacker comprises at least one stabilizing lobe, preferably at least 4 stabilizing lobes, more preferably 8 stabilizing lobes. The stabilizing lobe interacts with a stabilizing slit comprised in a base located on the top of said side walls. In one embodiment, the cassette comprises more slits than lobes. Preferably, the cassette comprises a number of stabilizing slits equal to the number of stabilizing lobes. The advantages of the interaction of stabilizing lobes and stabilizing slits for loading of the cassettes onto the stacker are as described hereinbefore. The analytical system further comprises a handler for transferring multiwell plates from said stacker to said apparatus for analyzing the analyte.

In one aspect of the analytical system, a lift for moving a stack of multiwell plates in an upward direction is comprised in the stacker. In one aspect of the present invention, the stacker comprises a movable loader support which contacts a lower contact surface of the cassette. Preferably, the stacker comprises a first motor for moving the lift, and a second motor for moving the movable loader support. In a preferred embodiment, the analytical apparatus of the analytical system comprises a module for preparing a reaction mixture for analyzing said analyte, and a module for analyzing said analyte. Further preferred embodiments of the analytical system and apparatus are as described herein.

The term “analyte” as used herein may be any type of biomolecule which is of interest for detection, and the detection thereof is indicative of a diagnostic status of an organism. The organism can be animal or, more preferably, human. Preferred analytes are proteins, polypeptides, antibodies or nucleic acids. More preferably, the analyte is a nucleic acid.

In one aspect of the present invention, the invention relates to a method of analyzing an analyte. The method comprises the steps of loading a cassette as described herein into a stacker of an analytical system; transferring a multiwell plate set from said cassette to a position for preparing a reaction mixture with a handler; preparing said reaction mixture; transferring said multiwell plate comprising said reaction mixture to a temperature controlled incubator; analyzing said analyte. In the method of the present invention, steps b) to e) are automated. Preferably, the method additionally comprises the automated steps of providing a sample comprising an analyte; isolating and purifying said analyte; wherein these steps precede step a).

An exemplary and non-limiting embodiment of the present invention is shown in FIGS. 9 to 21.

Figure 9:
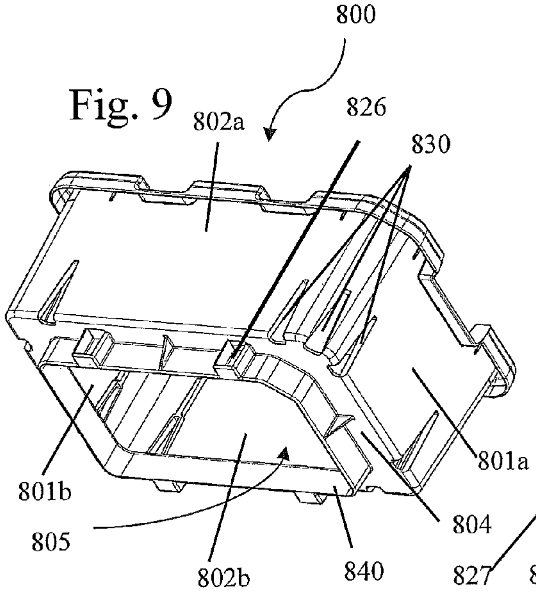
FIG. 9 shows a 3 D view of the empty cassette from the lower side.
Figure 10:
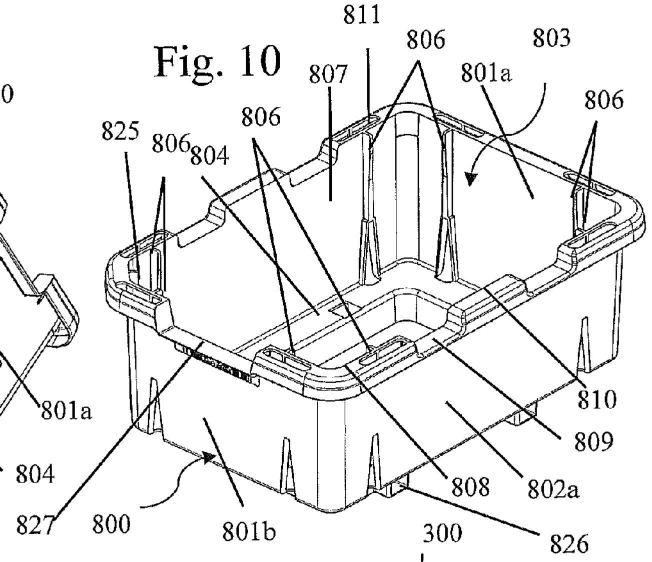
FIG. 10 shows a 3 D view of the empty cassette from the top side
Figure 11:
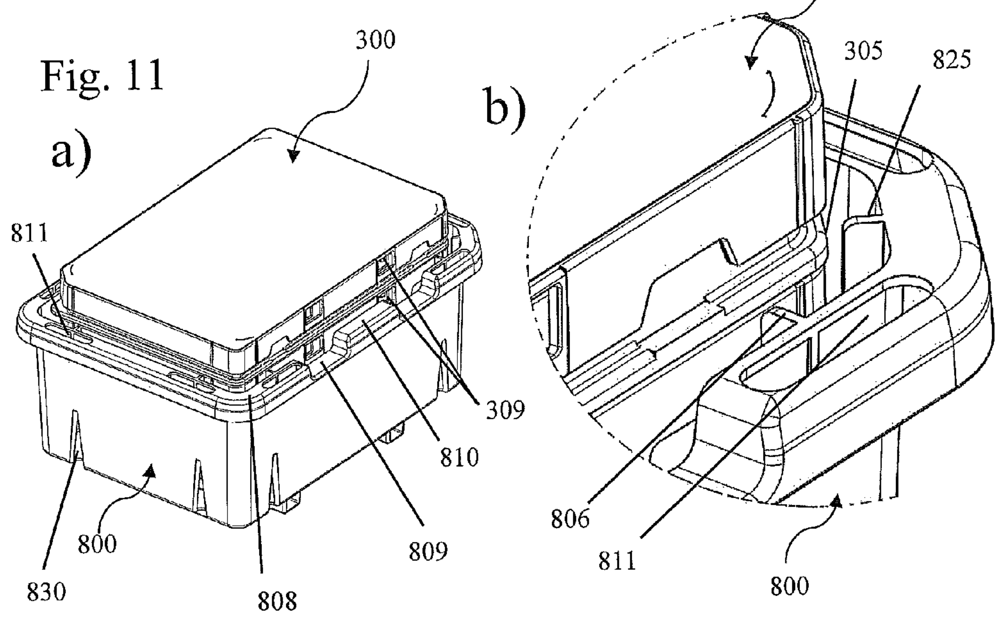
FIG. 11*a*) shows a view of a cassette filled with AD plate and lid pairs. In *b*), hardware identifiers of cassette and AD plate are shown.
Figure 12:
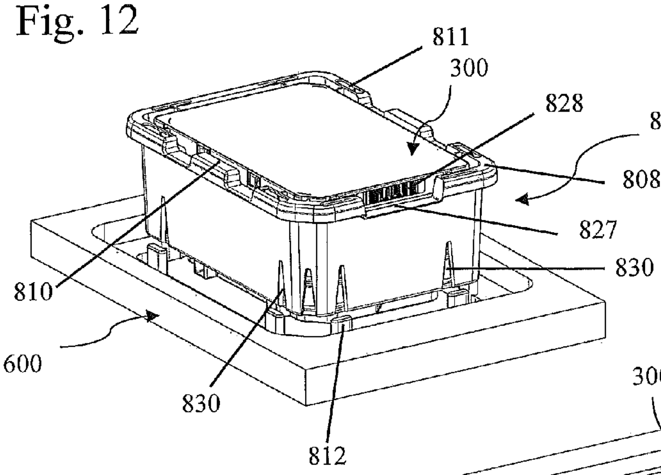
FIG. 12 shows the Cassette prior to loading into the stacker.

FIGS. 9 and 10 show a cassette (800) with two short side walls (801*a, b*) located opposite each other, and two long side walls (802*a, b*) located opposite each other. The cassette (800) has an open top (803). The bottom surface (804) has an opening (805). The area of opening (805) is smaller than the area of a multiwell plate (300). The cassette (800) also comprises foot part (840). The cassette (800) has two guidances (806) on the inside (807) of every side wall (801*a, b*), (802*a, b*) for guiding a multiwell plate pair (300) into a centered position. The cassette comprises hardware identifiers (825) and the AD plate (301) comprises hardware identifiers (305) which are complementary such that only the right type of AD plates (300) can be loaded into the cassettes (800) (FIG. 11*a*) and *b*)).

Figure 13:
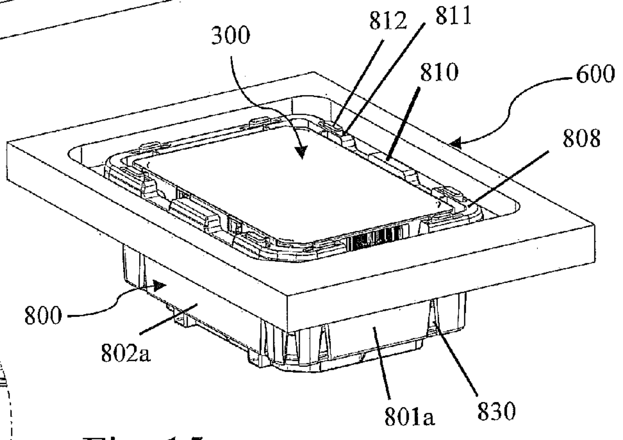
FIG. 13 shows the Cassette after loading into the stacker.
Figure 14:
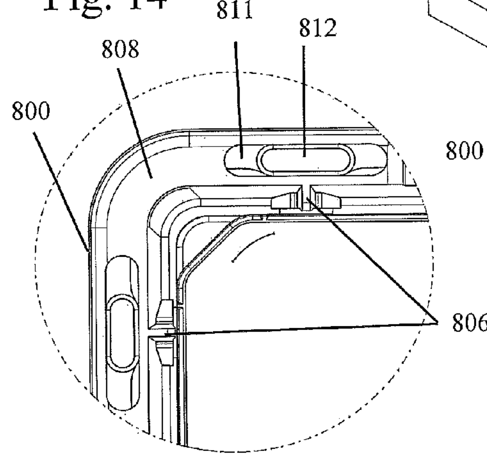
FIG. 14 shows a corner of a cassette comprising multiwell plate and lid pairs with stabilizing slits of the cassette engaged with stabilizing lobes of the stacker.
Figure 15:
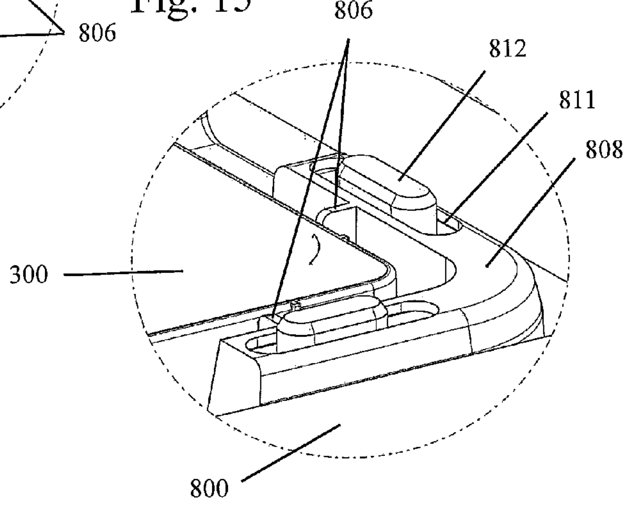
FIG. 15 shows a 3D sideways view of a corner of a cassette comprising multiwell plate and lid pairs with stabilizing slits of the cassette engaged with stabilizing lobes of the stacker.
Figure 16:
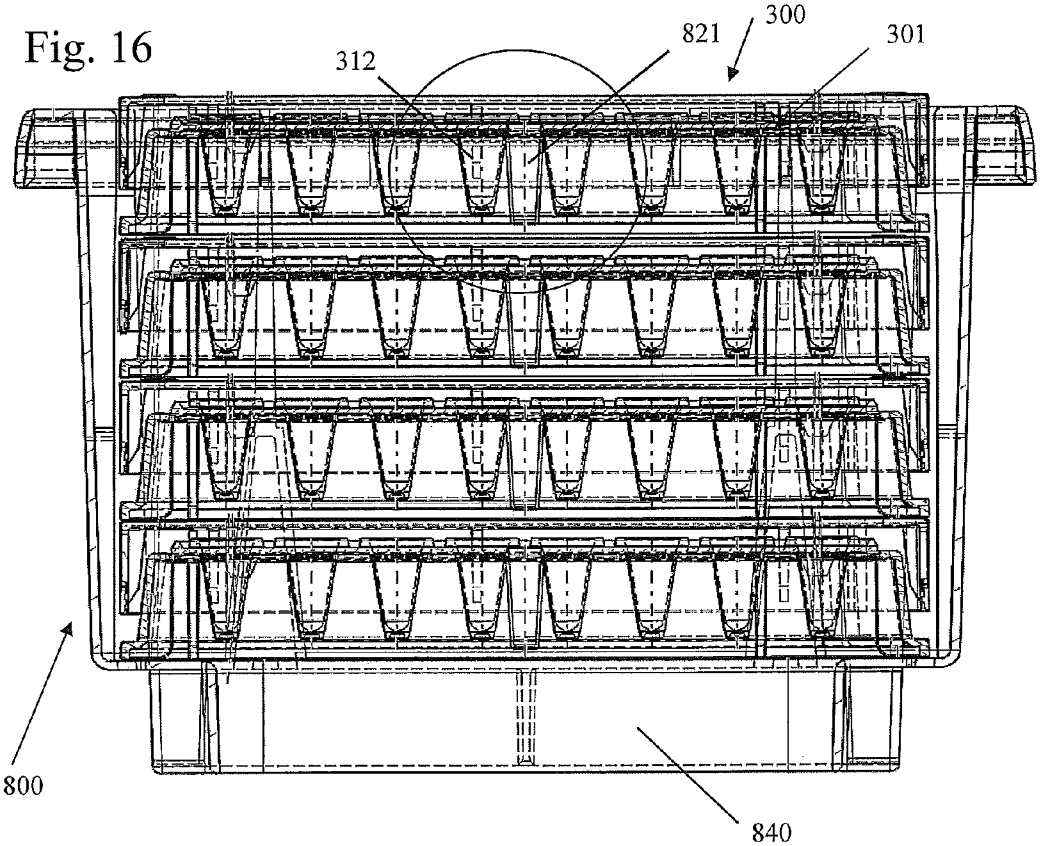
FIG. 16 shows a cut section parallel to a long side wall of a cassette with stacked multiwell plate and lid pairs and bolts which prevent scratching of vessels against foil.
Figure 17:
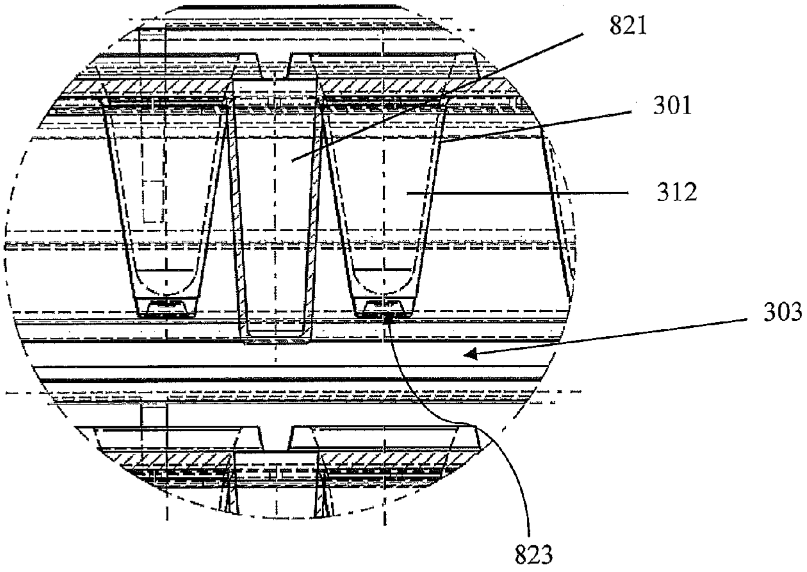
FIG. 17 shows an enlarged view of a bolt which prevents scratching of vessels against foil.
Figure 18:
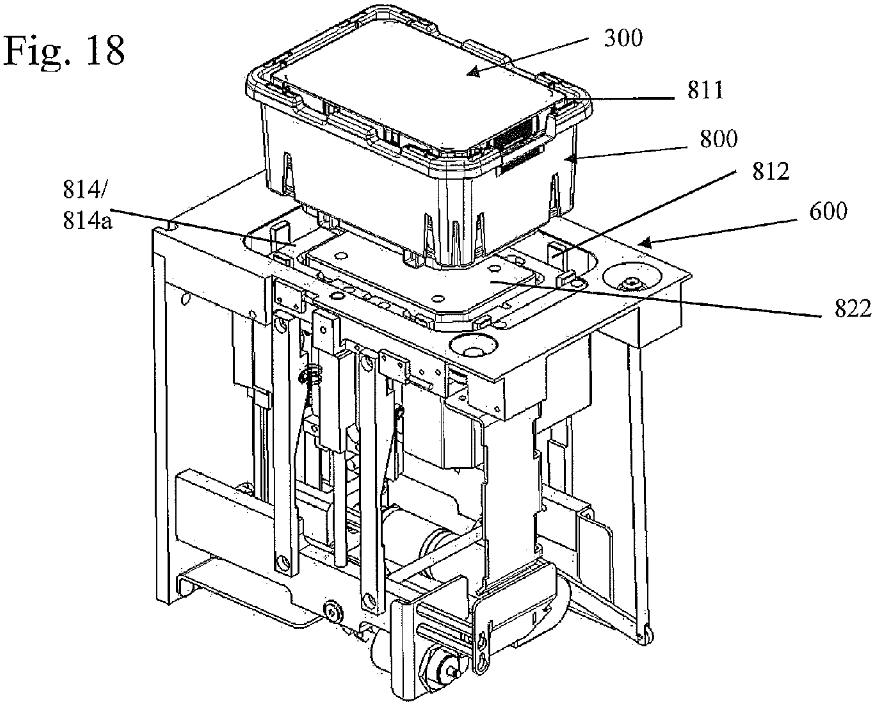
FIG. 18 shows cassette and stacker before loading.
Figure 19:
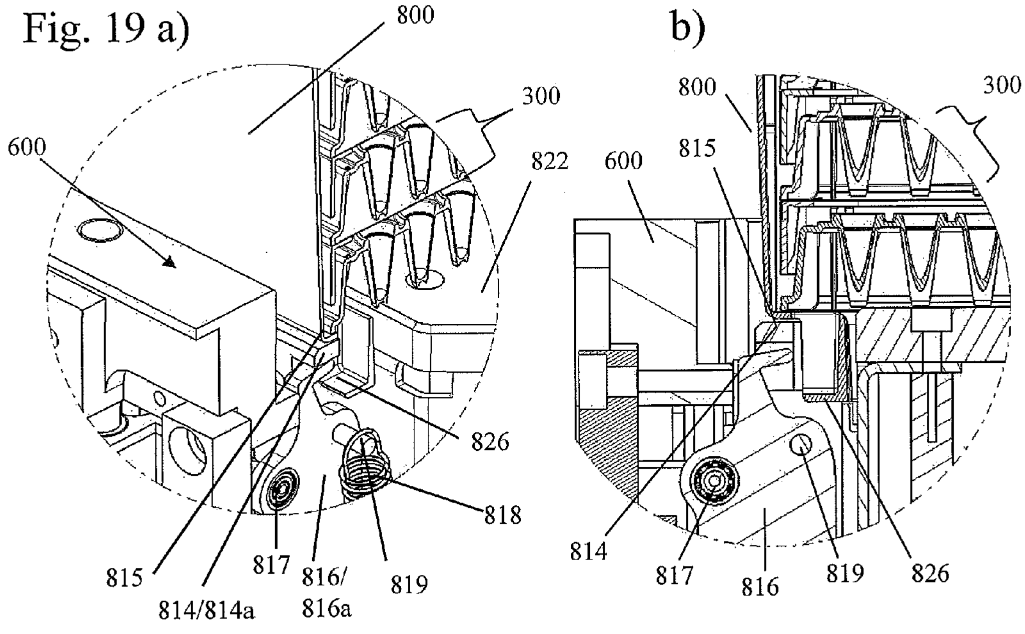
FIG. 19*a*) and *b*) show two views of a cassette loaded on the stacker, with the loader support of the stacker in an upper position.
Figure 20:
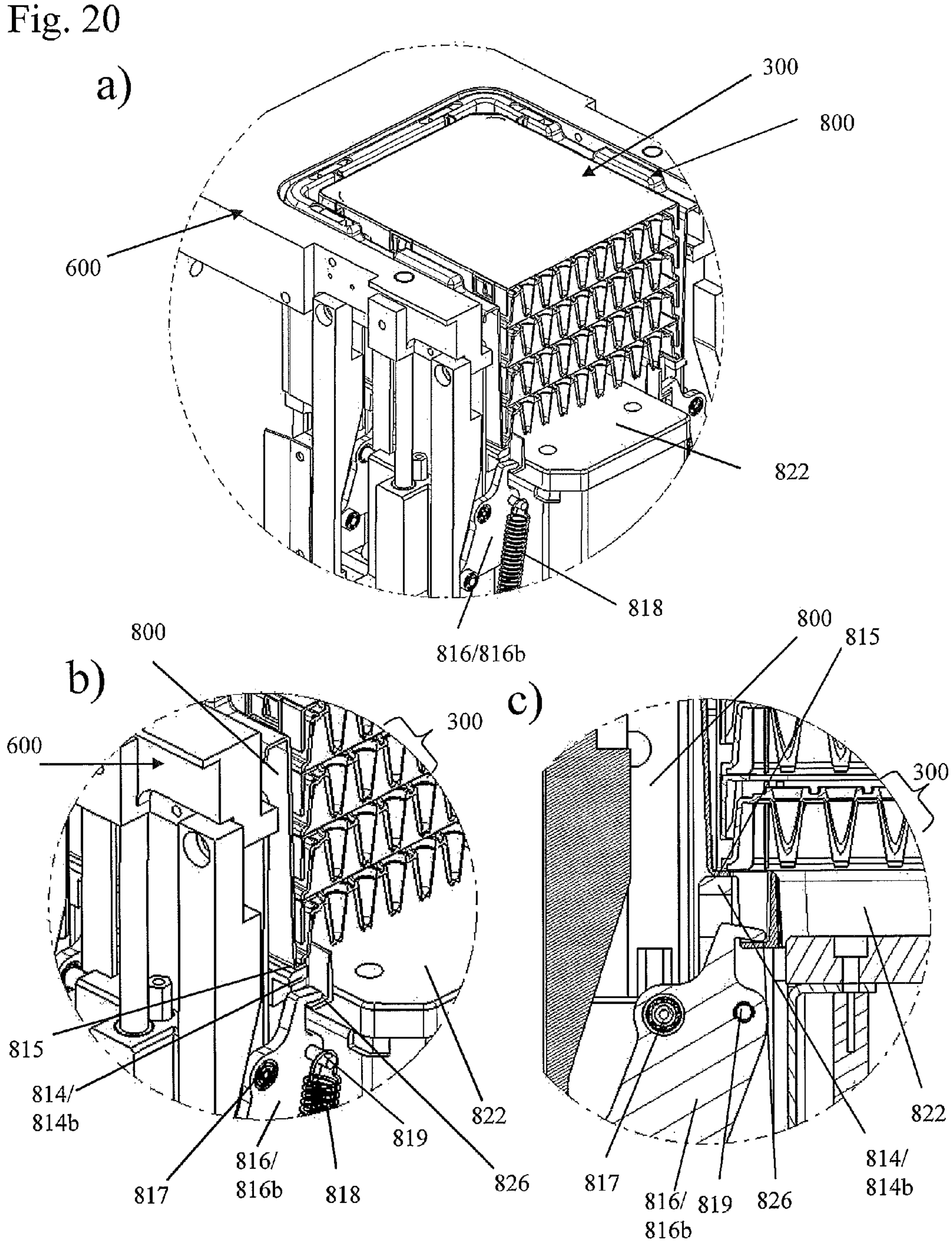
FIG. 20*a*) to *c*) shows a cassette loaded in the stacker with lift and loader support in the lowest position.
Figure 21:
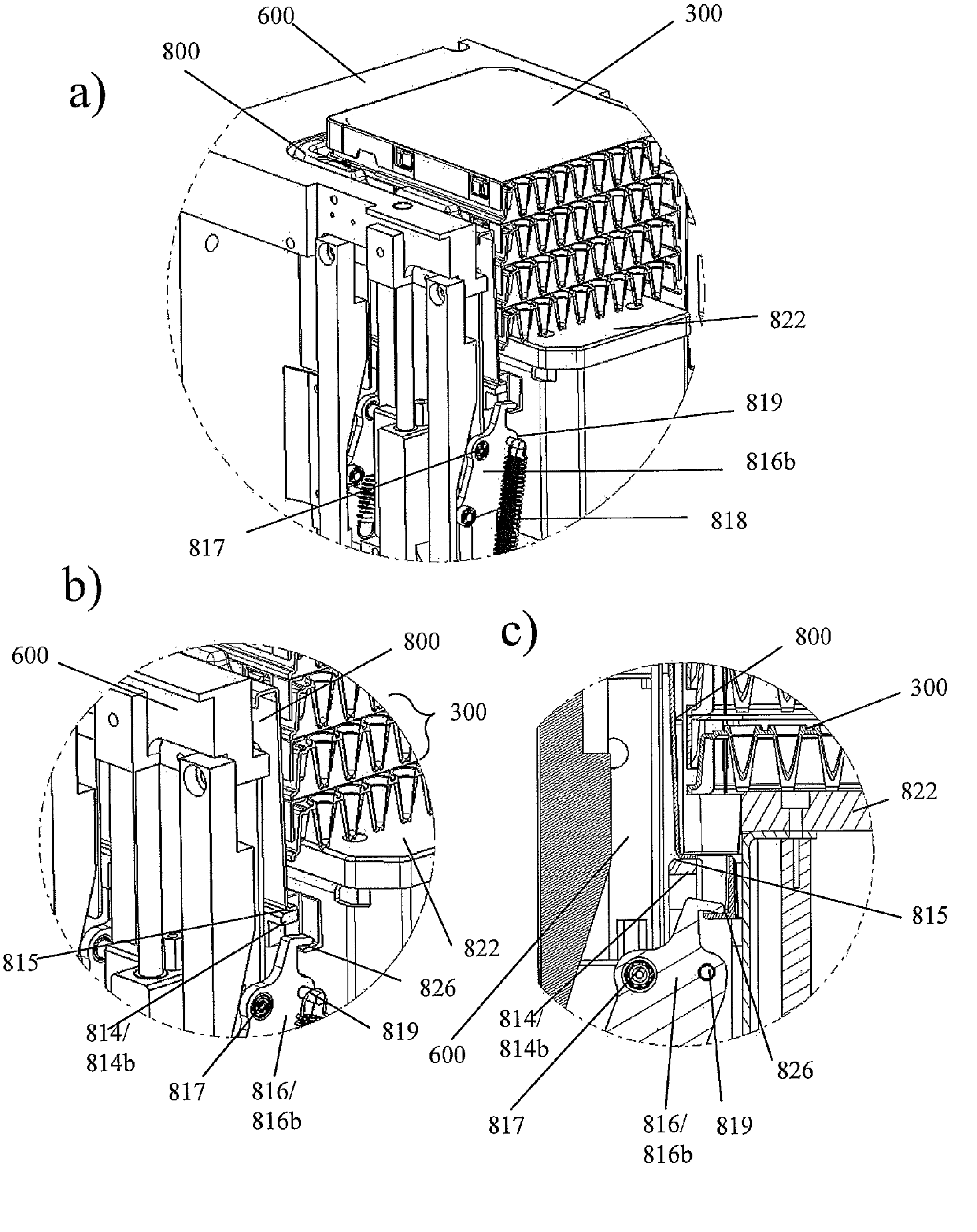
FIG. 21*a*) to *c*) shows a cassette comprising multiwell plate and lid pairs with the lift of the stacker pushing the plates inside the cassette upwards to allow handler access to the plates.

Furthermore, on the base (808) on the top end (810) of the longer side walls (802*a, b*) there are notches (809) which allow a handler (500) to access the multiwell plate pair (300) inside the cassette (800). The base (808) also comprises stabilizing slits (811). These stabilizing slits (811) can interact with stabilizing lobes (812) on the stacker (600) to ensure correct positioning of the cassette (800) in the stacker (600) (FIGS. 13-15). The cassette, furthermore, also comprises openings (827) on the base (808) of one shorter side wall (801) for allowing access to a bar code (828) on the multiwell plate (300) (shown in FIGS. 12).

On the lower side (820) of the multiwell plates (301), at least one bolt (821) is comprised. The bottom (822) of said bolt (821) is located below the bottom (823) of the vessels (312). When stacking the multiwell plate pairs (300), the bolts (821) prevent the bottom (822) of the vessels (312) to scratch the foil (303) of the multiwell plate pair (300) below. The optical and mechanical properties of the foil (303) are, thus, not altered during transport.

FIGS. 18 to 21 show the interaction of the cassette (800) with the stacker (600). The cassette (800) is manually loaded on the stacker (600). In FIG. 19*a*) and *b*), the cassette (800) is seated onto the loader support (814), which is in its upper position (814*a*), by its contact surface (815). The latches (816) for holding down the cassette (800) are in their open position (816*a*).

In FIGS. 20*a*) to *c*), the loader support (814) is in the lower position (814*b*). The four latches (816) are in their downhold position (816*b*) and exert a force on latch contact surfaces (826) of the cassette (800), thereby exerting a force on the contact surface (815) of the cassette (800) towards the loader support (814). The latches turn around a defined center point (817). The downholding force is created by a spring (818) which is attached to a spring fastening pin (819).

The stacker also comprises a lift (822) for moving the multiwell plate and lid pairs (300) into position for allowing the handler (500) to grip and transport a multiwell plate and lid pair (300) to a consumable holder within the analytical system (400). FIG. 21*a*) to *c*) shows how the lift (822) pushes the multiwell plate and lid pairs (300) upwards while the cassette (800) remains pressed against the loader support (814) in its lower position (814*b*).

When cassettes (800) are emptied of multiwell plate pairs (300), they are removed from the stacker (600) and stacked for disposal. Stacking slits (830) are provided on the lower side walls (801*a, b*; 802*a, b*) which are located to fit with guidances (806). This allows the cassettes (800) to be at least partially placed into each other, which reduces the space taken by the empty cassettes (800).

Preferred embodiments of multiwell plate and lid pairs and handler are described hereinafter.

Analytical System and Apparatus

FIG. 1 shows a schematic view of an analytical system (400) which is preferably used for nucleic acid analysis. The analytical system (400) comprises an analytical apparatus (440) with different modules or cells (401, 402, 403) which are connected by a transport system (480) having one or more handlers (500) for handling consumables, such as multiwell plates (300). The system (400) also comprises at least one stacker (600) for loading and holding consumables, preferably a cassette (800) according to the invention, required for the analytical process carried out automatically in the system (400). The stacker unit (600) also comprises a waste unit (650). Arrows indicate movement of consumables.

AD Plate and Frame

For amplification and detection, multiwell plates are commonly used. Such plates are particularly useful in automated analytical systems which comprise an amplification station for amplifying nucleic acid analytes.

In order to prevent contamination between wells prior to, during and after the amplification reaction, reaction vessels in which amplification takes place are sealed. A common way of sealing for amplification multiwell plates comprises placing a sealing foil on the plate and connecting it to the plate, either by gluing or by heat sealing.

The present invention discloses improved automated method for isolating and amplifying a nucleic acid, improved multiwell plate with a sealing foil and improved automated analytical system.

According to one aspect of the present invention, a method for isolating and amplifying a nucleic acid analyte that may be present in a fluid sample comprises separating said nucleic acid analyte from other material present in said fluid sample in a first vessel. Preferably, said first vessel is comprised in a first multiwell plate. A second multiwell plate is provided. This second multiwell plate comprises a lid which comprises a frame and a sealing foil. The lid is lifted and then the separated analyte in the first vessel is transferred to a well of the second multiwell plate. The lid comprising said sealing foil is placed on the second multiwell plate. Then the second multiwell plate is sealed with the sealing foil. Once the second multiwell plate is sealed, the analyte is amplified in the presence of amplification reagents which were added prior to sealing, in said second multiwell plate.

Thus, the present invention relates to a process for isolating and amplifying a nucleic acid analyte that may be present in a fluid sample, said process comprising the automated steps of:

a) separating said nucleic acid analyte from other material present in said fluid sample in a first vessel;
b) providing a second multiwell plate with a lid comprising a frame and a sealing foil;
c) lifting said lid;
d) transferring the separated analyte from the first vessel to a well of the second multiwell plate;
e) placing said lid comprising said sealing foil on the second multiwell plate;
f) sealing said second multiwell plate with said sealing foil;
g) amplifying the analyte in the presence of amplification reagents which were added prior to sealing, in said second multiwell plate.

In a preferred embodiment, in step b), the lid is present on the second multiwell plate in a first position, said first position preventing contact between the sealing foil and the multiwell plate; and in step e), the lid is placed on said second multiwell plate in a second position, wherein said second position promotes contact between said sealing foil and said multiwell plate.

In a preferred embodiment of the method hereinbefore described, the lid is rotated by 180°.

Preferably, the frame comprises supporting ribs, more preferably four supporting ribs, and the multiwell plate comprises corresponding recesses, more preferably four corresponding recesses, wherein said recesses are positioned such that the supporting ribs of the frame do not align with the recesses in the first position of the lid on the multiwell plate, and that the supporting ribs do align with the recesses in the second position of the lid on the multiwell plate.

In said second position, the supporting ribs of the frame are preferably placed within the recesses of the multiwell plate.

In one preferred embodiment of the method described herein, the sealing is heat sealing. Further preferred embodiments of the method according to the present invention are described hereinbefore or hereinafter.

The present invention further relates to a multiwell plate set comprising a multiwell plate and a lid, wherein said lid comprises a frame and a sealing foil affixed to said frame, wherein in a first position of said lid on said multiwell plate, a separation distance is located between said sealing foil and the top surface of said multiwell plate, and in a second position, the sealing foil is in contact with said top surface of the multiwell plate. Preferably, the frame comprises supporting ribs and the multiwell plate comprises openings, wherein, in said first position, the supporting ribs are in a different location than the openings, and in said second position, said supporting ribs and said openings align. In a preferred embodiment of the multiwell plate set herein described, the top surface of said multiwell plate comprises heat rims, and in said second position, the sealing foil contacts the heat rims. Preferably, the sealing foil is affixed to the frame by a heat sealing method. More preferably, the sealing foil is affixed to the top surface of the frame. In a preferred embodiment, the sealing foil comprises a polymer. Preferably, the sealing foil comprises at least two layers with different melting points. More preferably, the sealing foil comprises two layers with different melting points, wherein the layer with the lower melting point is oriented towards the multiwell plate. Further preferred embodiments of the method according to the present invention are described hereinbefore or hereinafter.

The exemplary multiwell plate with a frame comprises a multiwell plate (300) which comprises a multitude of vessels (312). Said vessels (312) are integrally formed on the upper surface (326) of the multiwell plate (301). On the upper surface (326) each vessel (312) is surrounded by an elevated heat rim (311). The lid (302) comprises a frame (302*b*) comprising a polymer (314) and a foil (303) comprising a polymer. The foil (303) is affixed to the frame (302*b*) by a heat sealing method. Preferably, the foil (303) is sealed onto the top surface (302*a*), more preferably by heat sealing. The multiwell plate and frame may be made of materials commonly used for multiwell plates, including plastics, preferably polystyrenes or polypropylenes or other polymers. A most preferred material is ALTECH® PS A 1000/536 AS WHITE WT1113-05. Preferably, the multiwell plate additionally comprises an antistatic material, preferably said antistatic material is selected from the group comprising oil or ash or soot. Other consumables may also comprise such antistatic materials, e.g. tip-racks etc.

The multiwell plate (300) comprises two long side walls (323, 324) which are opposite each other, and two short side walls (319, 320) which are opposite each other. The frame (302*b*) comprises two long side walls (328, 327) which are located opposite each other and two short side walls (321, 322) which are located opposite each other.

Figure 3A:
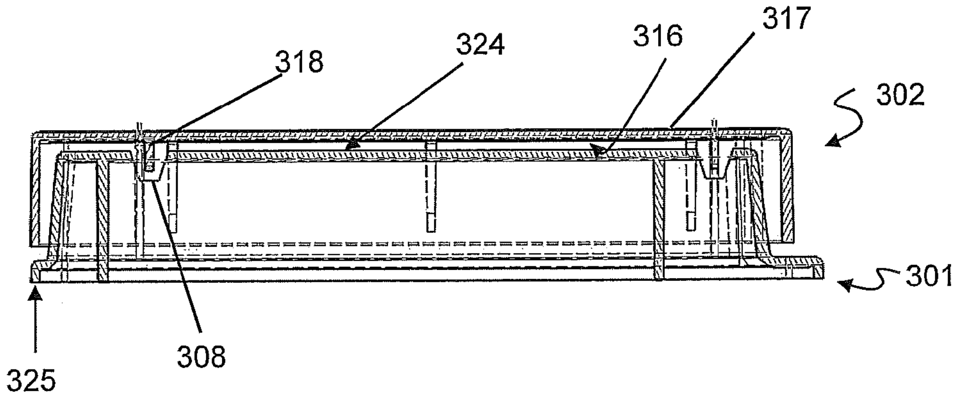
FIG. 3*a*) shows a sectional side view of the AD plate and frame in sealing position; *b*) shows a sealing foil with two layers and the top of the lid comprising a frame.
Figure 3B:
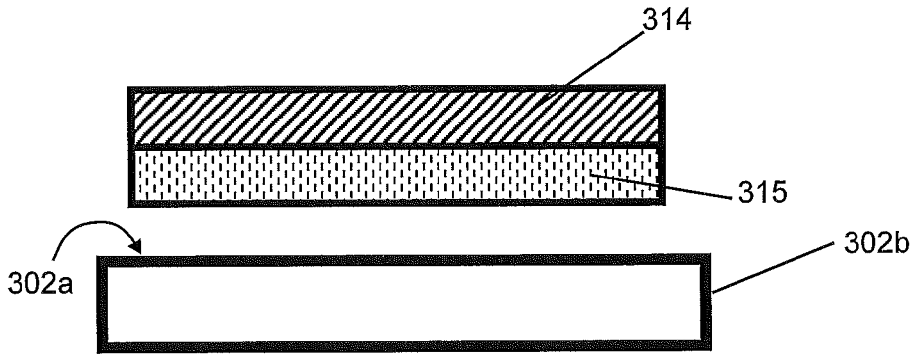

The preferred foil (303) comprises two layers (314, 315) with different melting points. One layer (315) has a lower melting point. This layer (315) is oriented towards the multiwell plate (301) with the heat rims (310, 311) and the surface (302*a*) of the frame (302*b*). During heat sealing, heat is transferred through the more stable layer (314) with the higher melting point to layer (314) with the lower melting point. Layer (315) is, thus, heated and melted. The upper layer (314) is not melted during heat sealing. This minimizes the risk of a leaking foil (303) (FIG. 3*b*)).

Figure 2A:
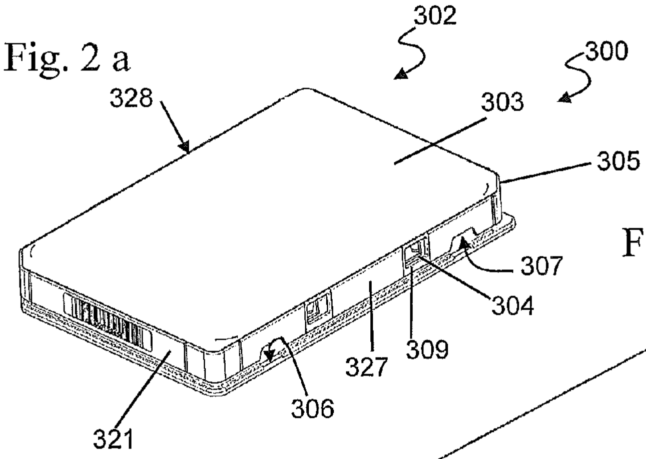
FIG. 2*a*) to *d*) shows the AD plate and frame with sealing foil in storage position (*a*), with lifted lid (*b*), during rotation of lid (*c*) and in sealing position (*d*).
Figure 4A:
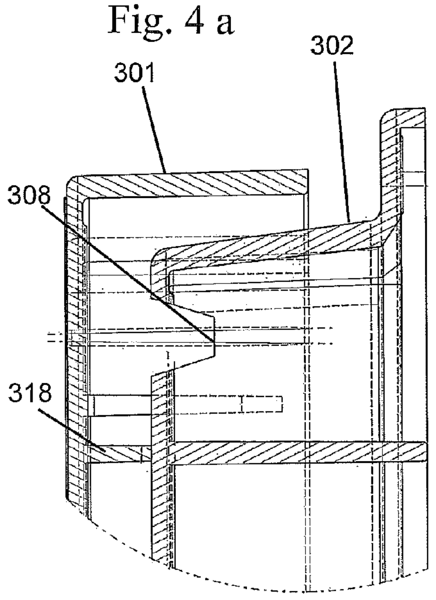
FIG. 4*a*) and *b*) show side and top sectional views of one corner of the AD plate and frame in storage position. *c*) to *d*) show side and top sectional views of a corner of the AD plate and frame in sealing position.
Figure 4B:
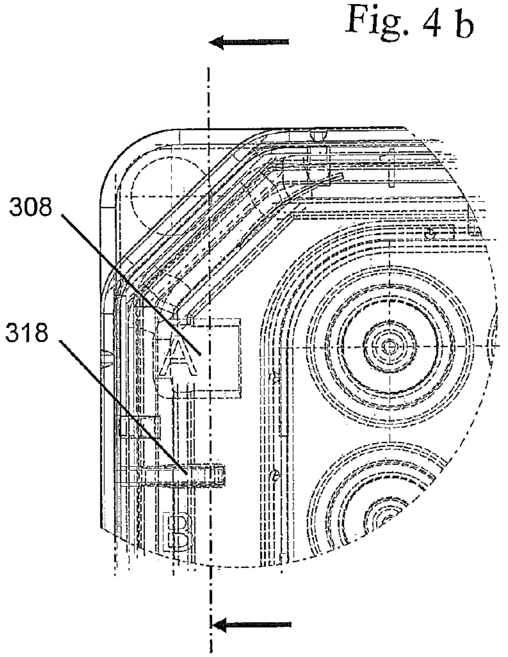
Figure 4C:
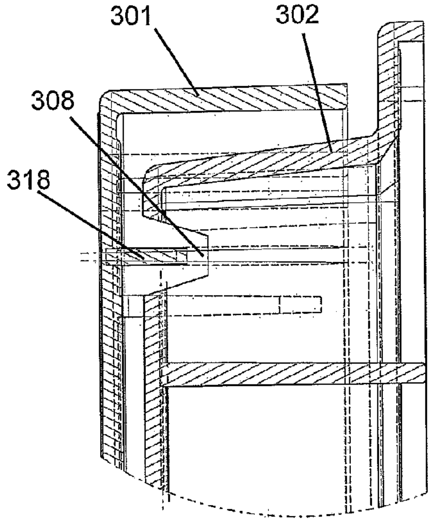
Figure 4D:
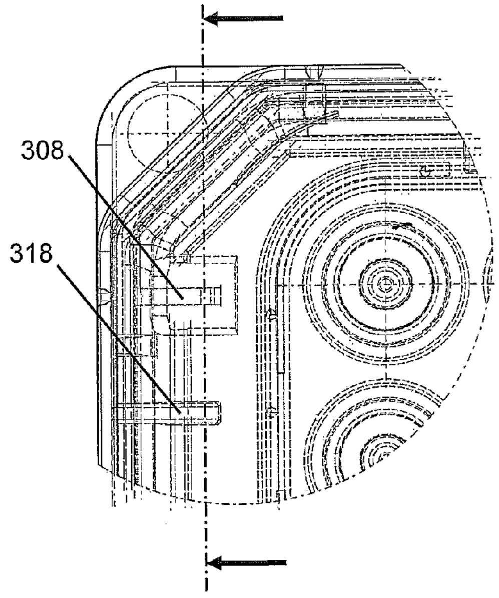
Figure 5A:
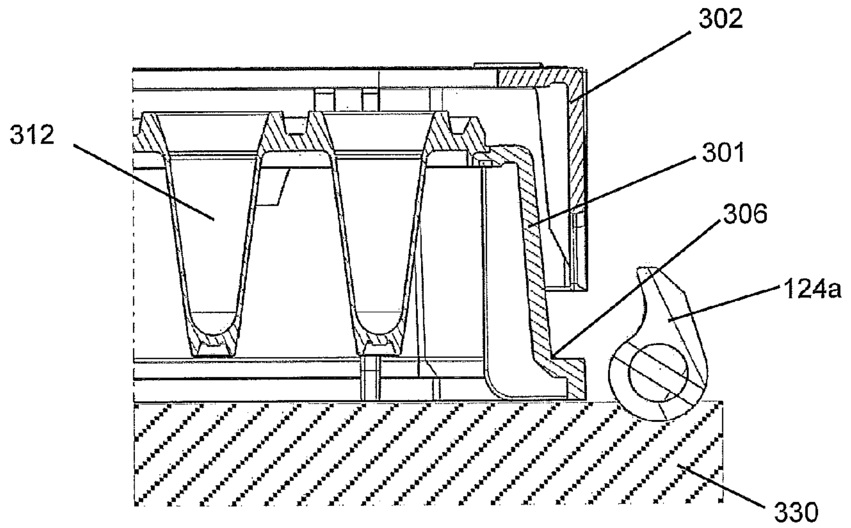
FIG. 5*a*) and *b*) show the fitting of the AD plate in a station for receiving the AD plate with the locking mechanism disengaged (*a*) or engaged (*b*).
Figure 5B:
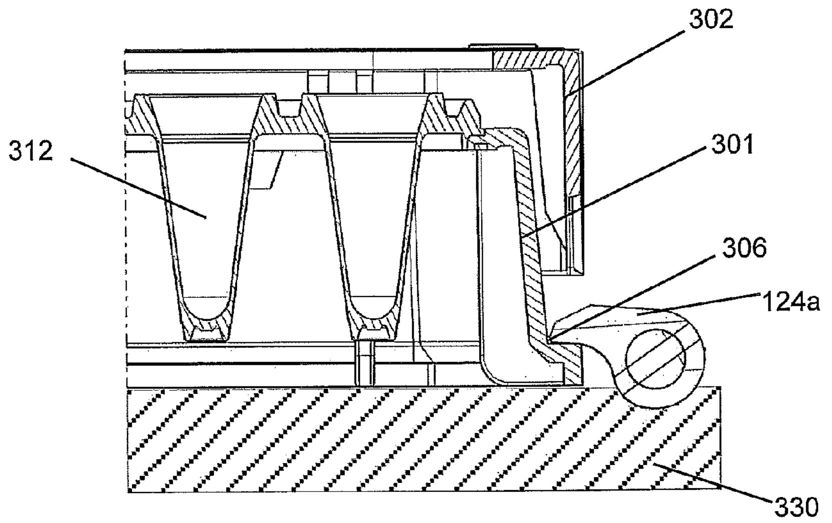

The multiwell plate (301) and lid (302) are assembled pairwise (300) for supply. On the inside (316) of the top surface (317), the frame (302*b*) comprises supporting ribs (318). Two supporting ribs (318) are located along a first side wall (321) of the frame (302*b*), and two supporting ribs (318) are located along a second side wall (322) opposite of the first side wall (321). Preferably, said side walls are the short side walls of the frame (302*b*). The edge of the top surface (313) of the multiwell plate (301) comprises openings (308). Said openings (308) are located alongside walls (319, 320) corresponding to the side walls of the frame (321, 322) where the supporting ribs (318) are located. In the assembly/supply position of the lid (302) relative to the multiwell plate (301) (FIG. 2*a*), the openings (308) are placed such that they do not align with the supporting ribs (318). Thus, when the lid (302) is placed on the multiwell plate (301), the supporting ribs (318) sit on the top surface (313) of the multiwell plate (301) (FIG. 4*a*)). This prevents the foil (303) from contacting the heat rims (310, 311), and, thus, prevents scratches on the foil (303) that may otherwise be caused by slipping of one multiwell plate (300) over the surface of the foil of a second multiwell plate (300) and which may impair the optical and mechanical properties of the foil (303) during transport, storage and loading.

Figure 2B:
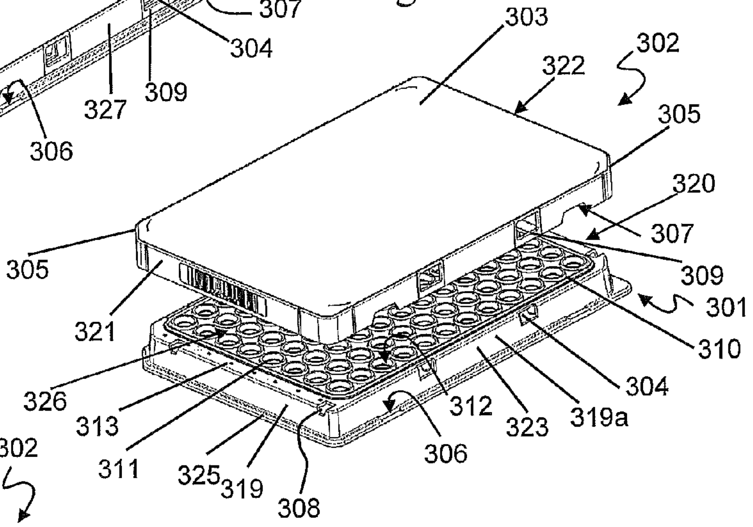
Figure 2C:
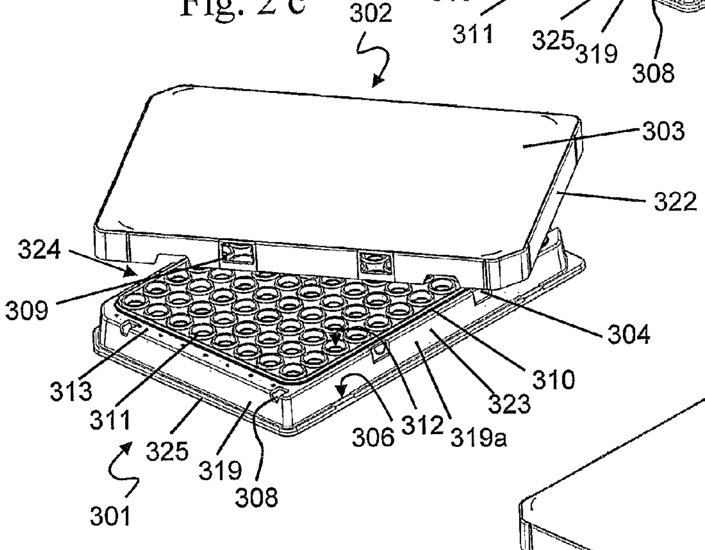
Figure 2D:
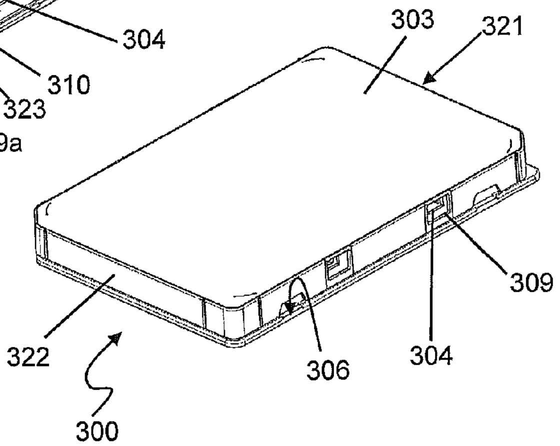

When the microwell plate (301) with lid (302) is used in an analytical instrument (440), the lid (302) is lifted for addition of purified analyte and reagents. When all reagents are added to the vessels (312), the lid (302) is rotated by 180° and placed on the multiwell plate (301) (FIG. 2*b*) and *c*)). The openings (308) on the top of the multiwell plate (301) and the supporting ribs (318) on the frame (302*b*) are brought into alignment by the 180° rotation. Thus, when placed on the multiwell plate (301), the foil (303) is brought into contact with the heat rims (311) surrounding the vessels (312) of the multiwell plate (301), and heat can be applied to seal the vessels (312) with the foil (303) (FIG. 2*d*), FIG. 3*a*)).

Both microwell plate (301) and lid (302) comprise a length and width of the base corresponding to ANSI SBS footprint format. More preferably, the length is 127.76 mm+/−0.25 mm, and the width is 85.48 mm+/−0.25 mm. They comprise openings (304) on plate (301) and (309) on lid (302) which are constructed and arranged to be gripped by a handler (500), either in pairwise arrangement or individually. Thus, it is possible to grip and transport the assembled plate and frame (300), or only the lid (302) or only the plate (301).

The frame (302*b*) comprises a recess (307). This recess is located at the lower end of the side of the frame (302*b*). The recess is preferably located in a different position than openings (304). Preferably, two recesses (307) are located on one side of the frame (302), and two recesses (307) are located on the opposite side of the frame (302*b*). Most preferably, said recesses (307) are located in the same position as recesses (306) on the multiwell plate (301). The recesses (307) ensure that when the plate (301) is fixed by engagement of fixing elements (124*a*) and recesses (306) only the multiwell plate (301) is fixed, not the lid (302).

Handler

In one aspect of the method hereinbefore described, the method comprises the automated steps of:

a) providing a fluid sample in a multiwell vessel in a first station;
b) combining together a solid support material and said fluid sample in a well of said multiwell vessel for a period of time and under conditions sufficient to permit said analyte to be immobilized on the solid support material;
c) isolating the solid support material from other material present in the fluid sample in a separation station;
d) and purifying the analyte in the separation station by separating the fluid sample from the solid support material and washing the materials one or more times with a wash buffer;

wherein said multiwell vessel is contacted by a handler and wherein said multiwell vessel is transported between stations by said handler, wherein said contact between said handler and said multiwell vessel is a form-locking contact.

Preferably, the method additionally comprises the step of analyzing the purified analyte in a analyzing station. More preferably, the analyzing is performed in a second multiwell plate.

Even more preferably, said second multiwell plate is contacted by at least one handler and transported between stations, wherein said contact between said at least one handler and said multiwell vessel is a form-locking contact. Furthermore, the handler preferably transports the multiwell vessel between two stations, or between three stations. Said stations are preferably a storage station and/or a sample station and/or a separation station and/or a holding station and/or a sealing station and/or an analyzing station, and/or a detection station.

In a preferred embodiment, the method additionally comprises the step of providing pipette tips in a tip rack, wherein said tip rack is contacted by at least one handler and transported between stations, wherein said contact between said at least one handler and said tip rack vessel is a form-locking contact. One of the stations is preferably a storage station. Other preferred stations are the stations described herein.

In a preferred embodiment, said analyzing station is an amplification station. Preferably, the amplification station is an amplification and detection station.

Figure 6:
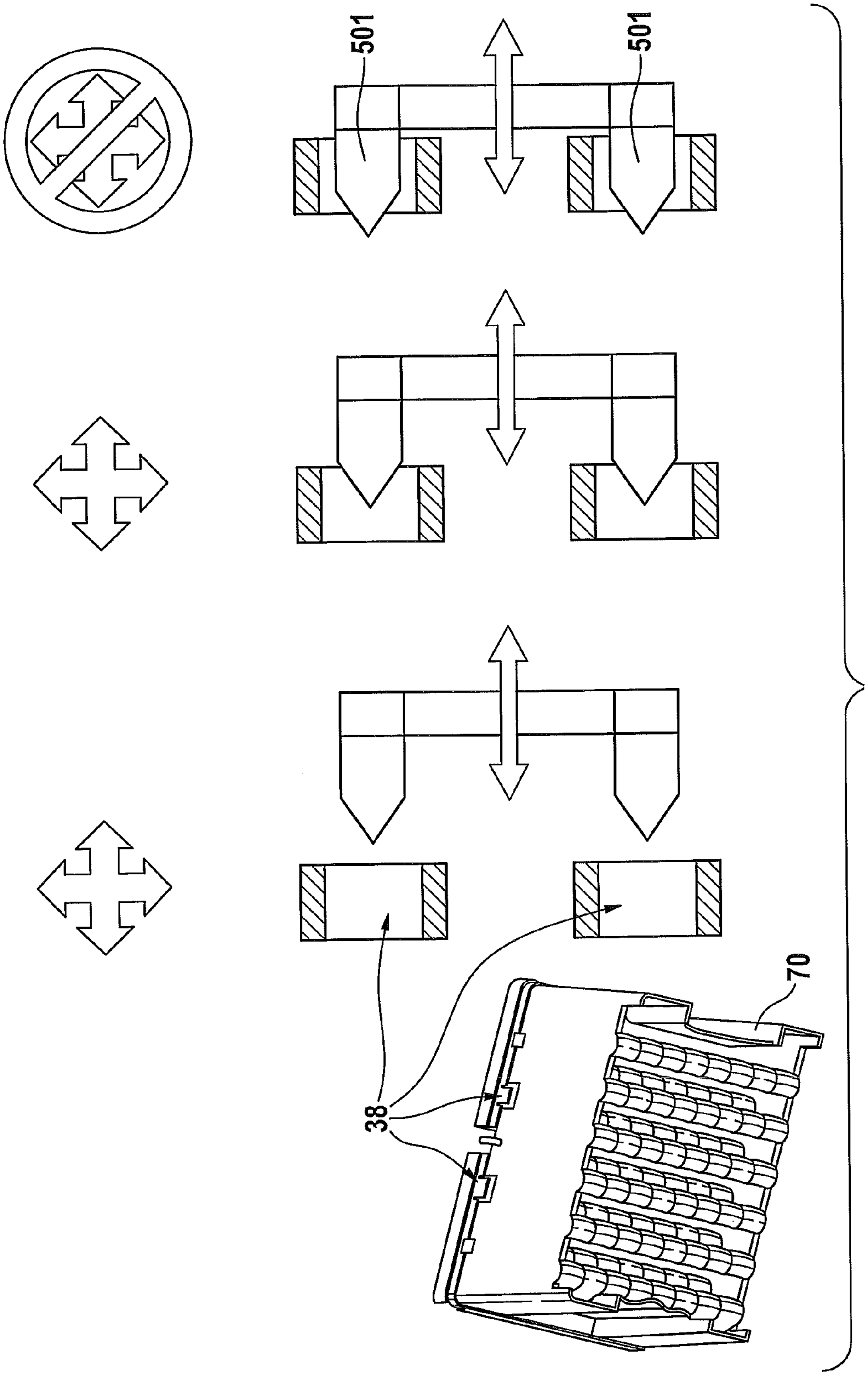
FIG. 6 shows the interaction of a tip rack with the gripper, fingers. The form-lock of the gripping prevents movement in X and Y direction (see right hand panel).
Figure 7:
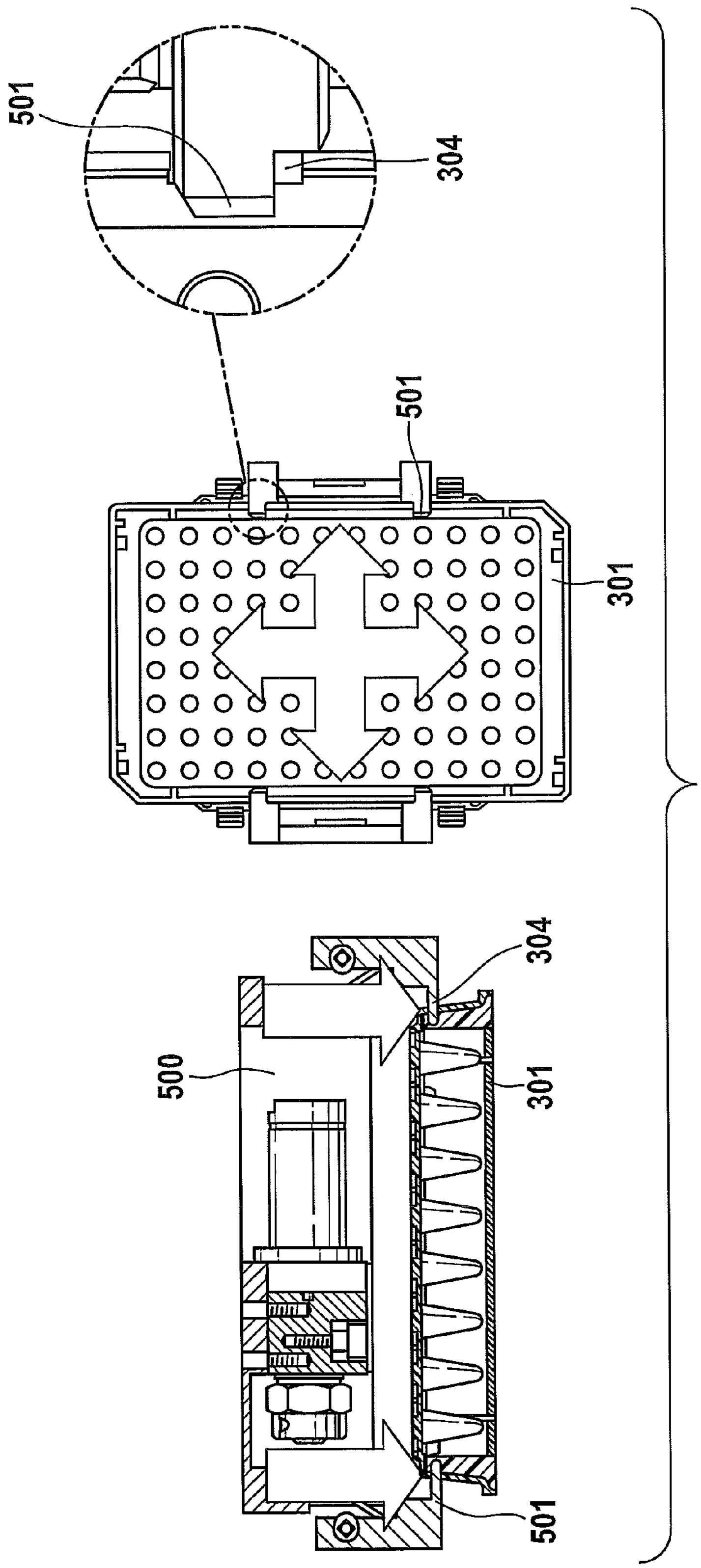
FIG. 7 shows the interaction between the handler and a multiwell plate. The gripper fingers interlock with openings on the multiwell plate, resulting in a form-lock gripping.

In a preferred embodiment, said handler comprises gripper fingers, wherein said gripper fingers fit with a recess of the multiwell plate, wherein said fit is form-locking. (FIG. 6, 7).

The present invention also relates to a system for purifying and analyzing an analyte, comprising a processing cell comprising a separation station for separating an analyte comprised in a vessel of a multiwell plate from a solid support material. Preferably, said separation station is constructed and arranged to separate an analyte comprised in a vessel of a multiwell plate from a solid support material. The system further comprises an analyzing cell comprising an analyzing station, wherein said station comprises an incubator to process said analyte to generate a signal indicative of the presence or absence of said analyte. Additionally, the system comprises more than one consumable comprising openings wherein at least one opening is located on one side wall of the consumable and at least one opening is located on the opposing side wall of the consumable. A gripper system comprising at least one handler is also comprised in the system, wherein said at least one handler comprises at least one gripper finger on one side of the handler, and at least one gripper finger on the opposing side of the handler. Said gripper fingers interact with said openings on the consumables and wherein said interaction is a form-locking interaction. Preferably, the system hereinbefore described additionally comprises a sample cell constructed and arranged to transfer a liquid sample from a sample vessel to a multiwell vessel. In a preferred embodiment, the multiwell vessel is transported between cells with said gripper system. In a further preferred embodiment, the multiwell vessel is transported from said sample cell to said analyzing cell. Preferred consumables are described herein.

Figure 8A:
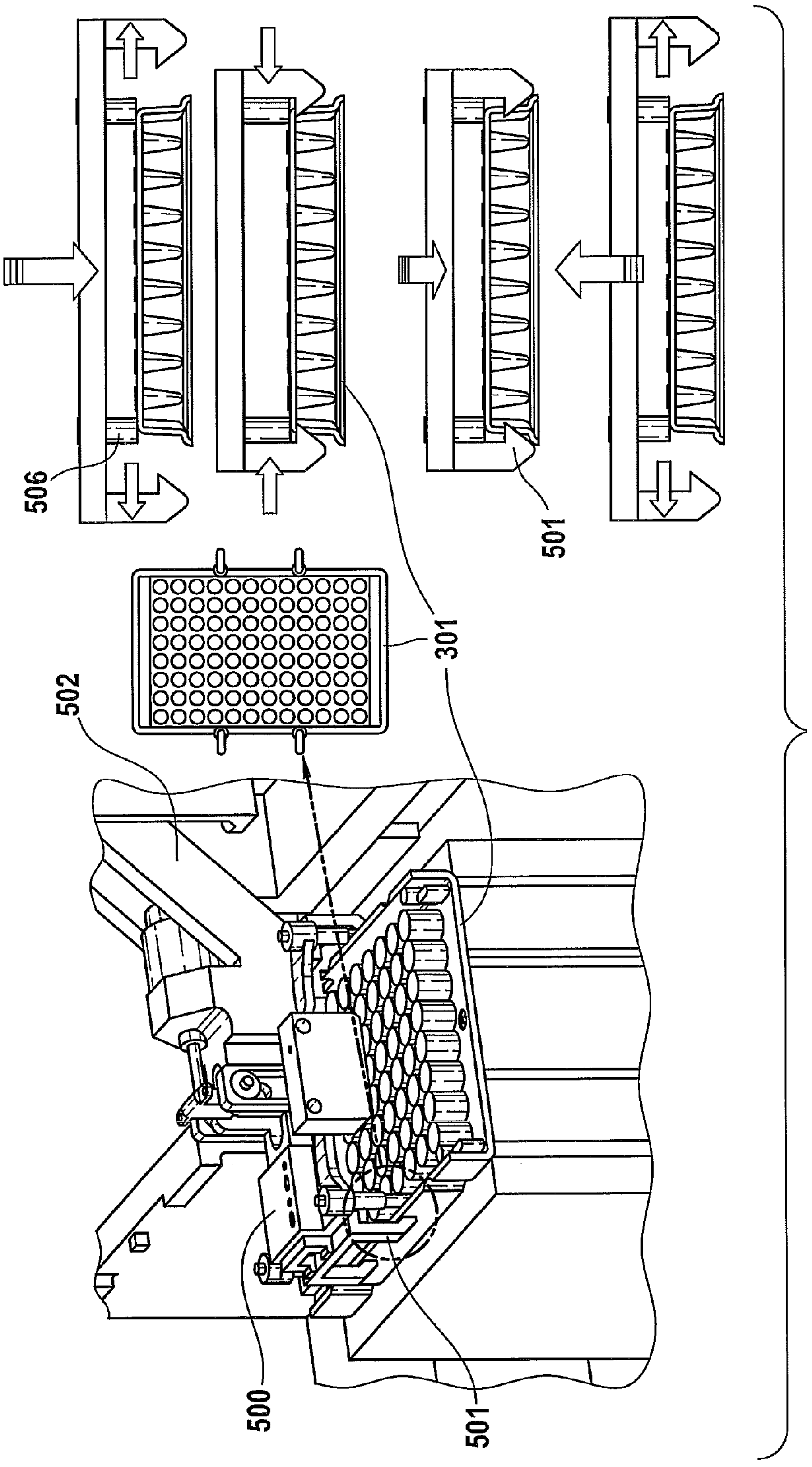
FIG. 8*a*) and *b*) show the handler connected to a robotic arm, and the attachment and release of the consumable by the gripper fingers. *c*) shows that the handler interacts with different consumable with the same interface.

A preferred handler (500) comprises a central part (500*b*) which is connected to a robotic arm (502). The central part (500*b*) comprises, on two opposite sides, gripper fingers (501). The gripper fingers (501) are movable. When engaging with a consumable (60, 70, 101, 301, 302) comprising form-locking elements (38, 106, 507, 309), as hereinbefore described, the gripper fingers (501) connect with the consumable (60, 70, 101, 301, 302). The gripper fingers (501) are moved towards the consumable (60, 70, 101, 301, 302), interlock with the form locking elements (38, 106, 507, 309), until the gripper fingers (501) reach a stop. In this position, a form-locked position between handler (500) and consumable (60, 70, 101, 301, 302) exists. The handler (500) connected to the robotic arm (502) can move the consumable (60, 70, 101, 301, 302) from one position to a second position. To release the consumable (60, 70, 101, 301, 302), the gripper fingers (501) move away from the consumable (60, 70, 101, 301, 302). Preferably, the handler comprises spring-mounted pins (506). Said pins (506) are forced away from the consumable (60, 70, 101, 301, 302) when the handler (500) is pushed on the consumable (60, 70, 101, 301, 302). In this position, the gripper fingers (501) can interact with the form locking elements (38, 106, 507, 309) of the consumable (60, 70, 101, 301, 302). When pressing the handler (500) down on the consumable (60, 70, 101, 301, 302), the gripper fingers (501) can move away from the form locking elements (38, 106, 507, 309) of the consumable (60, 70, 101, 301, 302) (FIG. 8*a*).

Figure 8B:
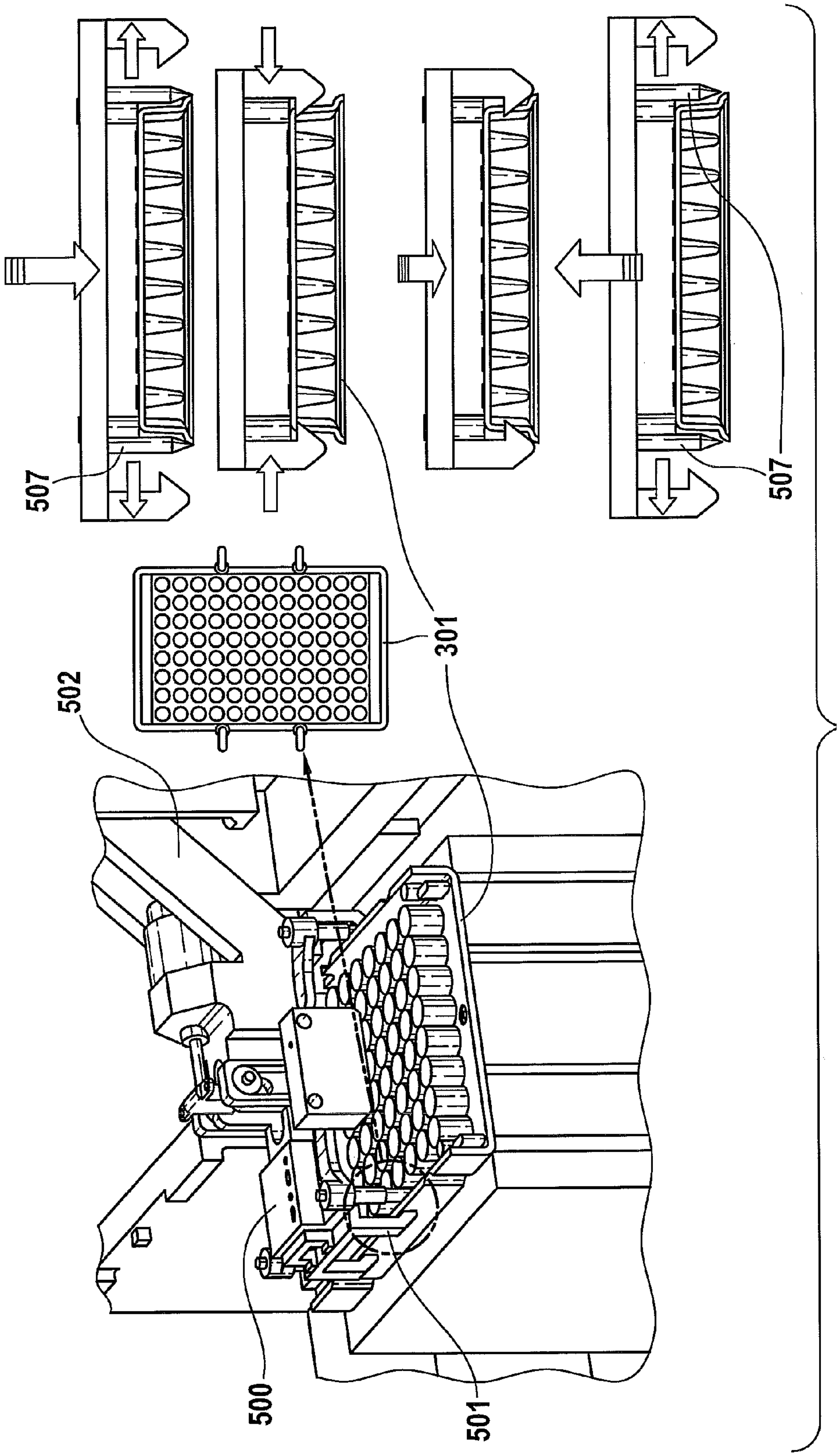
Figure 8C:
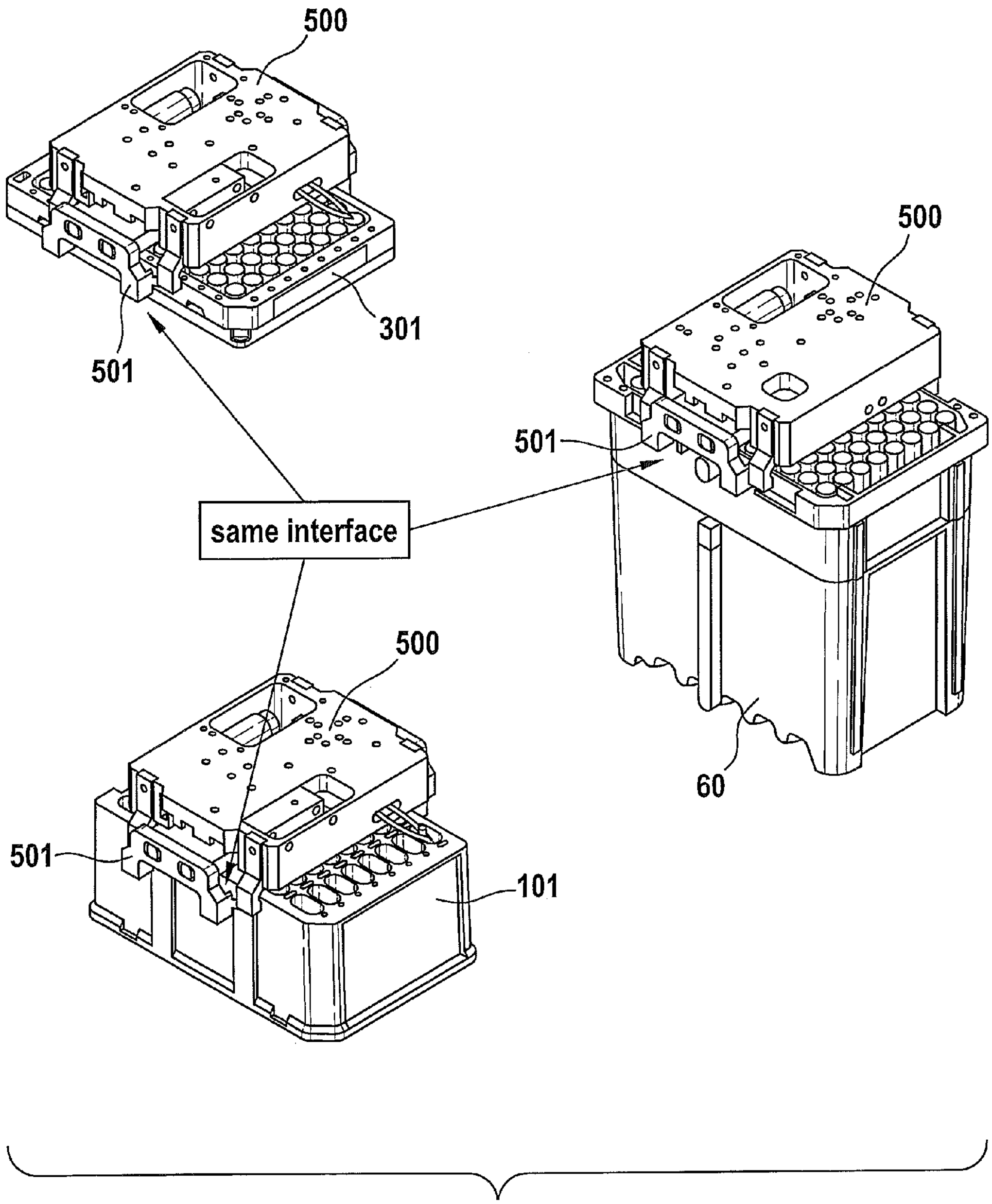

The handler (500) also comprises pins (507) which are located sideways of the multiwell plate when the handler (500) is moved downwards on the consumable (60, 70, 101, 301, 302) prior to gripping. These pins (507) guide the consumable (60, 70, 101, 301, 302) into the correct position for gripping. Furthermore, said pins (507) prevent the consumable (60, 70, 101, 301, 302) from getting stuck to the handler (500) when the gripper fingers (501) move away from the consumable (60, 70, 101, 301, 302) (FIG. 8*b*)

Preferably said form-locking elements (38, 106, 507, 309) are openings (38, 106, 507, 309) in the side walls of the consumable, more preferably the long side of the consumable (60, 70, 101, 301, 302). Preferably, two openings (38, 106, 507, 309) are located on one side wall, and two openings (38, 106, 507, 309) are located on the opposite side wall.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above can be used in various combinations. All publications, patents, patent applications, and/or other documents cited in this application are incorporated by reference in their entirety for all purposes to the same extent as if each individual publication, patent, patent application, and/or other document were individually indicated to be incorporated by reference for all purposes.

What is claimed:

1. A cassette for holding at least two multiwell plates, wherein said cassette comprises at least two multiwell plates with a lid stacked on each other, wherein said multiwell plates comprise more than one vessel, said cassette comprising:

a bottom surface comprising an inner opening having an area which is smaller than the area of a multi-well plate, two short side walls located opposite each other;

two long side walls located opposite each other; and an upper rim surrounding the periphery of said short and long side walls and located opposite said bottom surface, wherein said upper rim is sized to allow a multiwell plate to pass through said upper rim and into said cassette;

wherein said upper rim comprises one or more stabilizing slits configured to interact with a corresponding set of one or more stabilizing lobes positioned in a stacker; and wherein said cassette further comprises at least two multiwell plate sets, wherein any one of said multiwell plate sets comprises a multiwell plate and a lid, wherein said lid comprises a frame and a sealing foil affixed to said frame, wherein said lid is located on said multiwell plate in a first position, said first position comprising a separation distance located between said sealing foil and the top surface of said multiwell plate.

2. The cassette of claim 1, wherein said cassette comprises at least one guidance on the inside of any one of said side walls for guiding said multiwell plates into a centered position.

3. The cassette of claim 2, wherein any one of said side walls comprises at least two guidances on the inside wall.

4. The cassette of claim 1, wherein the top of said side walls comprise notches for allowing a handler to handle the multiwell plate located on the top of the stack of multiwell plates.

5. The cassette of claim 4, wherein the notches are located on said base extending around the top end of the two long side walls.

6. An analytical system comprising:

an apparatus for analyzing a sample comprising an analyte;

a stacker, wherein said stacker comprises at least one cassette, said cassette comprising:

a bottom surface comprising an inner opening having an area which is smaller than the area of a multi-well plate, two short side walls located opposite each other;

two long side walls located opposite each other;

an upper rim surrounding the periphery of said short and long side walls and located opposite said bottom surface, wherein said upper rim is sized to allow a multiwell plate to pass through said upper rim and into said cassette;

wherein said upper rim comprises one or more stabilizing slits configured to interact with a corresponding set of one or more stabilizing lobes positioned in said stacker to position said cassette in said stacker; and wherein said cassette further comprises at least two multiwell plate sets, wherein any one of said multiwell plate sets comprises a multiwell plate and a lid, wherein said lid comprises a frame and a sealing foil affixed to said frame, wherein said lid is located on said multiwell plate in a first position, said first position comprising a separation distance located between said sealing foil and the top surface of said multiwell plate; and a handler for transferring multiwell plates from said stacker to said apparatus for analyzing said analyte.

7. The analytical system according to claim 6, further comprising a lift for moving said stack of multiwell plates in an upward direction.

8. The analytical system of claim 6, wherein said cassette comprises at least two multiwell plates stacked on each other, wherein said multiwell plates comprise more than one vessel.

9. The analytical system of claim 6, wherein said cassette comprises at least two multiwell plates with a lid, said multiwell plates being stacked on each other.

10. The analytical system of claim 6, wherein said stacker comprises at least one latch to hold down the cassette.

* * * * *